Nov. 11, 1924.

W. E. SYMONS 1,514,879

SHOCK ABSORBING MECHANISM

Filed Dec. 27, 1922   2 Sheets-Sheet 1

Inventor
Wilson E. Symons
By Ritter & Ritter
his Attorneys

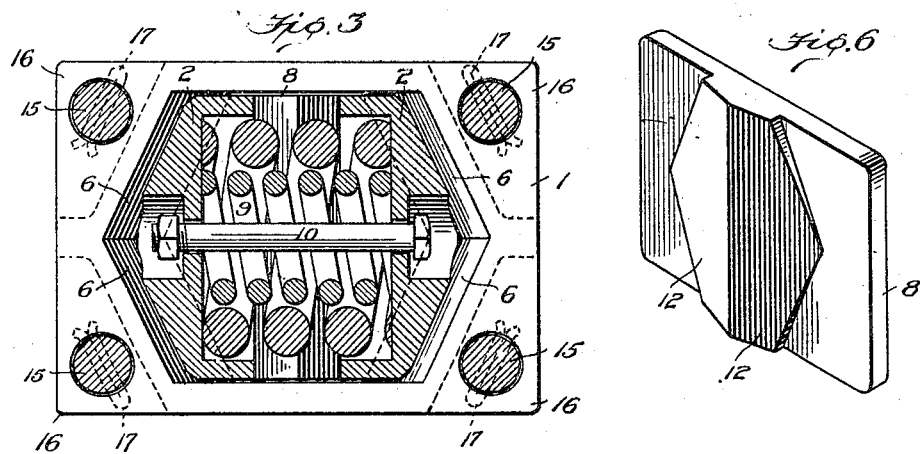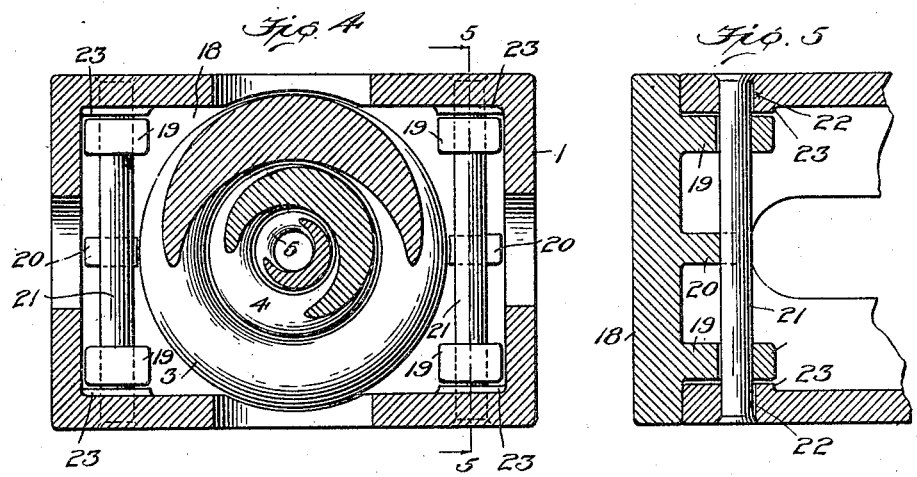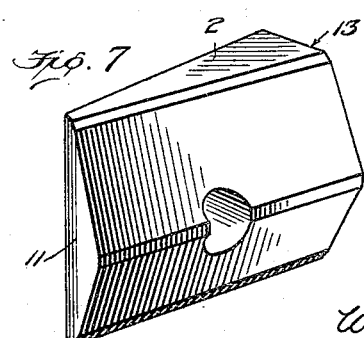

Patented Nov. 11, 1924.

1,514,879

UNITED STATES PATENT OFFICE.

WILSON E. SYMONS, OF NEW YORK, N. Y.

SHOCK-ABSORBING MECHANISM.

Application filed December 27, 1922. Serial No. 609,180.

*To all whom it may concern:*

Be it known that I, WILSON E. SYMONS, a citizen of the United States, residing at New York, in the county of New York and State of New York, have invented certain new and useful Improvements in Shock-Absorbing Mechanism; and I do hereby declare the following to be a full, clear, and exact description of the invention, such as will enable others skilled in the art to which it appertains to make and use the same.

My invention relates to shock absorbing mechanism which is especially adapted for use as the cushioning unit of draft appliances for railway cars and locomotives but which, of course, is not limited to such application, since it may be employed advantageously as a shock absorber in railway bumping posts, in safety devices located in the pits of passenger and freight elevators, in gun recoil mechanism, and in many other relations. The present invention is an improvement upon the mechanisms disclosed in my Patents No. 1,396,896, granted November 15, 1921, and No. 1,440,-320 granted December 26, 1922. Generally stated, the object of this invention is to simplify the construction, reduce its cost of manufacture and maintenance and to increase the strength and cushioning capacity of the device. This object is specifically accomplished by the particular arrangement of the principal compression springs and the employment of improved means for securing to the casing the end cap against which said springs bear.

The principal feature of the invention, generally stated, consists in attaching to a casing, which is open at opposite ends, an end cap having on its inner face a plurality of perforated lugs which extend into the casing and are attached thereto by keys or rivets, each of the said keys extending through a plurality of said lugs and said keys being arranged to extend across the casing and to receive the longitudinally disposed springs of the mechanism between them.

A further feature of the invention consists in employing in the organization of elements spring means involving three concentric helical springs compressible longitudinally of the casing of the mechanism, one or more of the said springs preferably being adapted to be compressed in advance of the remainder.

These features of my invention enable me to produce a self-contained shock absorbing unit of high static and dynamic capacity developing both spring and friction energy in response to the slightest movements and in the manufacture and maintenance of which no special machinery is required.

In the drawings illustrating the invention, the scope whereof is pointed out in the claims,—

Figure 3 is a transverse sectional view on the line 3—3. Fig. 2, showing the sectional form of the friction wedges in line with the axis of the transversely extending spring by which they are yieldingly separated.

Figure 4 is a sectional view on the line 4—4, Fig. 2.

Figure 5 is a detail sectional view on the line 5—5, Fig. 4, the end cap attaching rivet being in elevation.

Figure 6 is a perspective view of the follower which is interposed between the friction wedges and the forward end of the longitudinally compressible spring means located within the casing.

Figure 7 is a perspective view of one of the friction wedges.

Figure 1:
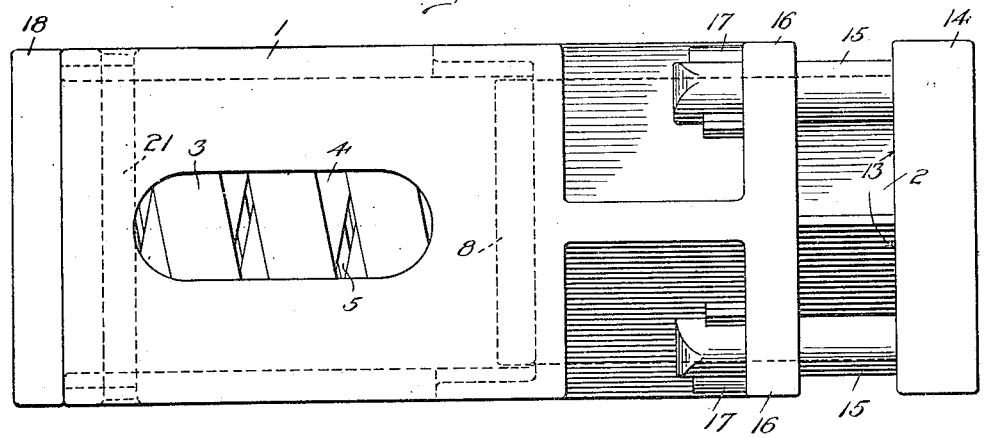
Figure 1 is a side elevation of a shock absorbing mechanism embodying the invention.
Figure 2:
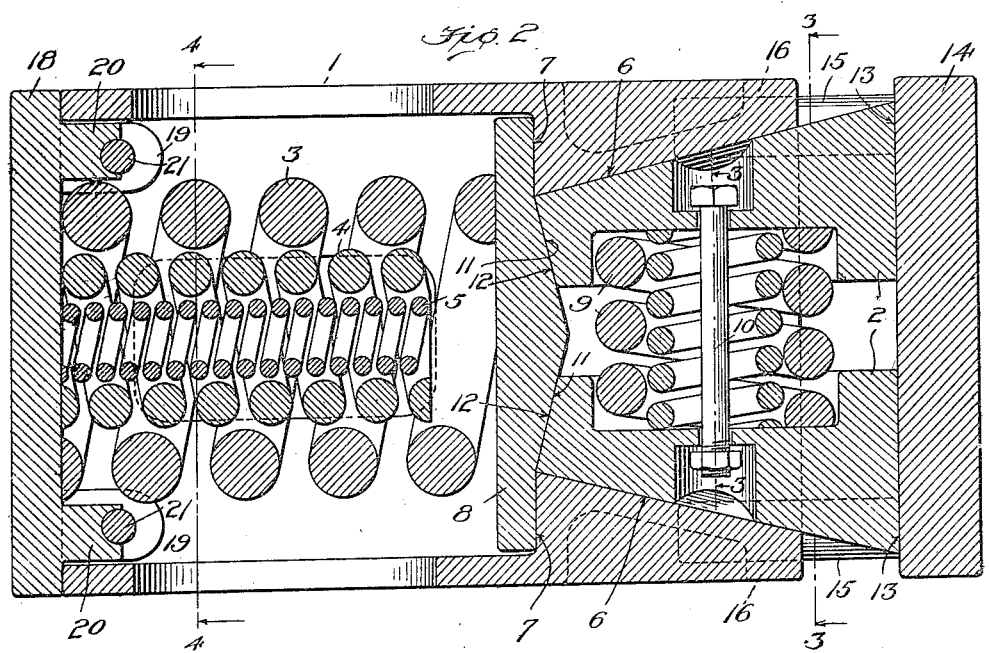
Figure 2 is a horizontal central section of the mechanism illustrated in Fig. 1.

In the drawings, 1 is a casing adapted to receive a plurality of friction elements or wedges 2 and longitudinally compressible spring means which are energized by the inward movement of the friction wedges. The casing 1 is open at opposite ends for the respective reception of the spring means and the friction wedges. The spring means referred to comprise three concentric helical springs 3, 4 and 5, respectively, which, as shown, are preferably of a character to result in the compression of the outermost spring in advance of the compression of those surrounded by it.

Intermediate of its ends the casing is formed interiorly on opposite sides with inclined faces 6 converging inwardly from the outer end of the casing. As heretofore disclosed in my patent and application referred to, a plurality of inclined faces 6 is preferably provided on each side of the casing, thus forming wedge shaped channels in which the movable friction wedges 2 are guided. At the inner ends of the convergent friction faces 6 the casing 1 is provided with oppositely disposed stop shoulders 7 forming seats for a longitudinally movable follower 8 bearing against the inner ends of the friction wedges 2. The follower 8 is adapted to be displaced from its seats 7 by the inward movement of the friction wedges, thereby effecting the compression of the springs 3, 4 and 5.

The pair of friction wedges 2 normally project outwardly beyond the forward end of the casing. They are slidably mounted in said casing and conform to the convergent inclined faces 6 with which they contact. Interposed between said wedges is a transversely extending spring 9 which is compressed when the wedges 2 move towards each other as the result of being forced into the casing. As shown, the transverse spring 9 is preferably of the double coil helical type. A bolt 10 passing through the spring 9 and through suitable openings in the wedges 2 is preferably employed for controlling the separation of said wedges, such a construction being advantageous in that it facilitates the assembly of the wedges and interposed spring with the other parts of the shock absorbing mechanism.

The inner ends 11 of the friction wedges and the faces 12 of the follower 8 with which they cooperate are preferably inclined to the direction of travel of the said follower. The outer ends 13 of the wedges, which engage the outer end plate or cap 14 of the mechanism, preferably lie in the same plane. The end plate 14 may advantageously be provided with a plurality of longitudinally extending posts 15 integrally united thereto. These posts which respectively extend through suitably apertured lugs 16 of the casing are slotted at their inner ends to receive split keys 17 serving to retain the end plate 14 in assembled relation to the casing.

The outer coiled spring 3, the intermediate spring 4 and the inner spring 5 are adapted to be compressed between the follower 8 which is movably mounted in the casing and a plate or cap 18 forming a closure for the rear end of the casing 1. The end cap 18 is provided on its inner face with a plurality of spaced perforated lugs 19 projecting into the casing 1 exteriorly of the outermost spring 3. The lugs 19 are arranged in pairs and overlap the spring 3 and between each pair of lugs the cap 18 is preferably provided with an intermediate lug 20. These intermediate lugs are adapted to support the rivets, rods or keys 21 by which the cap 18 is secured to the casing. The said lugs 20 preferably also serve to center the spring 3.

Each of the rivets 21 by which the spring seat or end cap 18 is secured to the casing extends through a pair of perforated lugs 19 and through opposite sides of the casing 1. As well shown in Fig. 5, the openings 22 in the casing for receiving the rivets 21 may be somewhat greater diameter than that of the rivets. The perforations of the lugs 19 are likewise preferably of greater diameter than the rivets and are designed to be slightly out of alinement with the openings 22 in the casing when the mechanism is assembled. By this means, as will be readily appreciated, a firm bearing of the plate or cap 18 upon the rear end of the casing 1 is ensured. If desired, the casing may be provided upon its interior with bosses 23 surrounding the apertures 22 in the casing, thus affording the pins or rivets 21 increased bearing area and increasing the strength of the fastening.

In assembling the mechanism the follower 8 is first placed in position within the casing and the concentrically arranged springs 3, 4 and 5 are inserted through the rear end of the casing. The end cap 18 is then positioned upon the rear end of the casing 1 and is secured thereto by means of the pair of rivets 21. The length of the spring 3 is preferably such that a slight initial compression is effected therein by the application of the end cap 18 to the casing. After having been connected by the bolt 10 the friction wedges 2 and their interposed springs 9 are brought into assembled relation with the convergent inclined faces 6 of the casing. The posts 15 of the forward end plate or cap 14 are thereafter passed through the corresponding perforated lugs 16 of the casing and the keys 17 are then driven through the slots at the inner ends of said posts.

I claim:—

1. In a shock absorbing mechanism, the combination with a casing which is open at opposite ends and is formed interiorly with oppositely disposed stop shoulders, of a follower normally seated upon said shoulders, friction elements engaging and adapted to actuate said follower and normally projecting outwardly beyond the end of said casing, a spring seated upon said follower an end cap for said casing against which said spring bears, and a plurality of keys for securing said end cap to said casing, said cap being provided on its inner face with a plurality of perforated lugs extending into said casing exteriorly of said springs, and each of said keys extending through a plurality of said lugs.

2. In a shock absorbing mechanism, the combination with a casing which is open at opposite ends, of a plurality of friction elements normally projecting from one end of said casing, a follower within said casing engaging the inner ends of said friction elements, a spring seated upon said follower on the side opposite said friction elements, and end cap for said casing against which said spring bears, and a plurality of keys for securing said cap to said casing, said cap being provided on its inner face with a plurality of lugs overlapping said spring, and each of said keys engaging a plurality of said lugs.

3. In a shock absorbing mechanism, the combination with a casing which is open at opposite ends, of a plurality of friction elements normally projecting from one end of said casing, a follower within said casing engaging the inner ends of said friction elements, a spring seated upon said follower on the side opposite said friction elements, an end cap for said casing against which said spring bears, and a plurality of rivets extending through said casing on opposite sides of said spring for securing said cap to said casing, said end cap being provided with a plurality of spaced perforated lugs, and each of said rivets extending through a plurality of said lugs.

4. In a shock absorbing mechanism, the combination with a casing which is open at opposite ends, of friction elements movably mounted in said casing, a follower within said casing engaging the inner ends of said friction elements, a spring seated upon said follower on the side opposite said friction elements, an end cap for said casing against which said spring bears, and a plurality of rivets extending through said casing on opposite sides of said spring for securing said cap to said casing, said end cap being provided on its inner side with a plurality of pairs of perforated lugs and with intermediate lugs respectively located between the perforated lugs of each pair on opposite sides of said spring, each of said rivets extending through a pair of said perforated lugs, and said intermediate lugs being adapted respectively to support said rivets between said perforated lugs.

In testimony whereof I affix my signature.

WILSON E. SYMONS.